US008728960B2

(12) United States Patent
Kacker et al.

(10) Patent No.: US 8,728,960 B2
(45) Date of Patent: May 20, 2014

(54) SPUNBOND FIBERS AND FABRICS FROM POLYOLEFIN BLENDS

(75) Inventors: Smita Kacker, Houston, TX (US); Chia Yung Cheng, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 499 days.

(21) Appl. No.: 11/655,399

(22) Filed: Jan. 19, 2007

(65) Prior Publication Data

US 2008/0172840 A1    Jul. 24, 2008

(51) Int. Cl.
  *D04H 3/16*    (2006.01)
  *C08L 23/04*   (2006.01)
(52) U.S. Cl.
  USPC ............................ 442/401; 19/66 R; 525/240
(58) Field of Classification Search
  CPC . C08L 23/10; C08L 2203/12; C08L 2205/02; C08L 2666/06; D01F 6/46; D04H 3/16
  USPC .................... 525/191, 240; 19/66 R; 442/401
  See application file for complete search history.

(56) References Cited

U.S. PATENT DOCUMENTS

| | | | |
|---|---|---|---|
| 3,825,379 A | 7/1974 | Lohkamp et al. | |
| 4,143,099 A | 3/1979 | Duncan | |
| 4,208,366 A | 6/1980 | Kinney | |
| 4,334,340 A | 6/1982 | Reba | |
| 4,405,297 A | 9/1983 | Appel et al. | |
| 4,813,864 A | 3/1989 | Balk | |
| 5,441,920 A | 8/1995 | Welborn, Jr. | |
| 6,121,395 A | 9/2000 | Turner | |
| 6,218,010 B1 | 4/2001 | Georgellis et al. | 428/373 |
| 6,235,664 B1* | 5/2001 | Georgellis et al. | 442/382 |
| 6,245,706 B1 | 6/2001 | Hlatky | |
| 6,342,565 B1* | 1/2002 | Cheng et al. | 525/191 |
| 6,635,715 B1 | 10/2003 | Cozewith et al. | 525/240 |
| 6,960,635 B2 | 11/2005 | Stevens et al. | |
| 2005/0106978 A1* | 5/2005 | Cheng et al. | 442/327 |
| 2005/0130544 A1* | 6/2005 | Cheng et al. | 442/415 |
| 2005/0170727 A1* | 8/2005 | Melik et al. | 442/327 |
| 2005/0182198 A1* | 8/2005 | Cheng et al. | 525/240 |
| 2006/0183861 A1 | 8/2006 | Harrington et al. | |

FOREIGN PATENT DOCUMENTS

| | | |
|---|---|---|
| WO | WO 00/70134 | 11/2000 |
| WO | WO 2005/052052 | 6/2005 |
| WO | WO 2006/044083 | 4/2006 |

OTHER PUBLICATIONS

C. Wadsworth et al., "Nonwoven Fabrics: Spunbonded and Melt Blown Processes", Proceedings of the Eighth Annual Nonwovens Workshop, Jul. 30-Aug. 3, 1990, Sponsored by TANDEC, University of Tennessee, Knoxville, Tenn.

* cited by examiner

*Primary Examiner* — Mark Eashoo
*Assistant Examiner* — David Karst

(57) ABSTRACT

The invention described relates to a polyolefin blend composition suitable for spunbond fiber or filament compositions, and to fabric compositions and composite constructions therefrom, said blend comprising a) from 60-98 wt % of at least one random propylene copolymer having a comonomer content of from 8 to 25 wt % and a crystalline melting point (Tm) as determined by differential scanning calorimetry (DSC) of from about 40° C. to about 110° C.; and b) from 2-40 wt % of at least one substantially isotactic polypropylene homopolymer or copolymer comprising one or more $C_2$ and/or $C_4$-$C_8$ comonomer, having a crystalline melting point (Tm) as determined by DSC greater than or equal to 120° C. The blends of the present invention typically have a melt flow rate (MFR) of from 100 g/10 min to about 500 g/10 min.

11 Claims, 1 Drawing Sheet

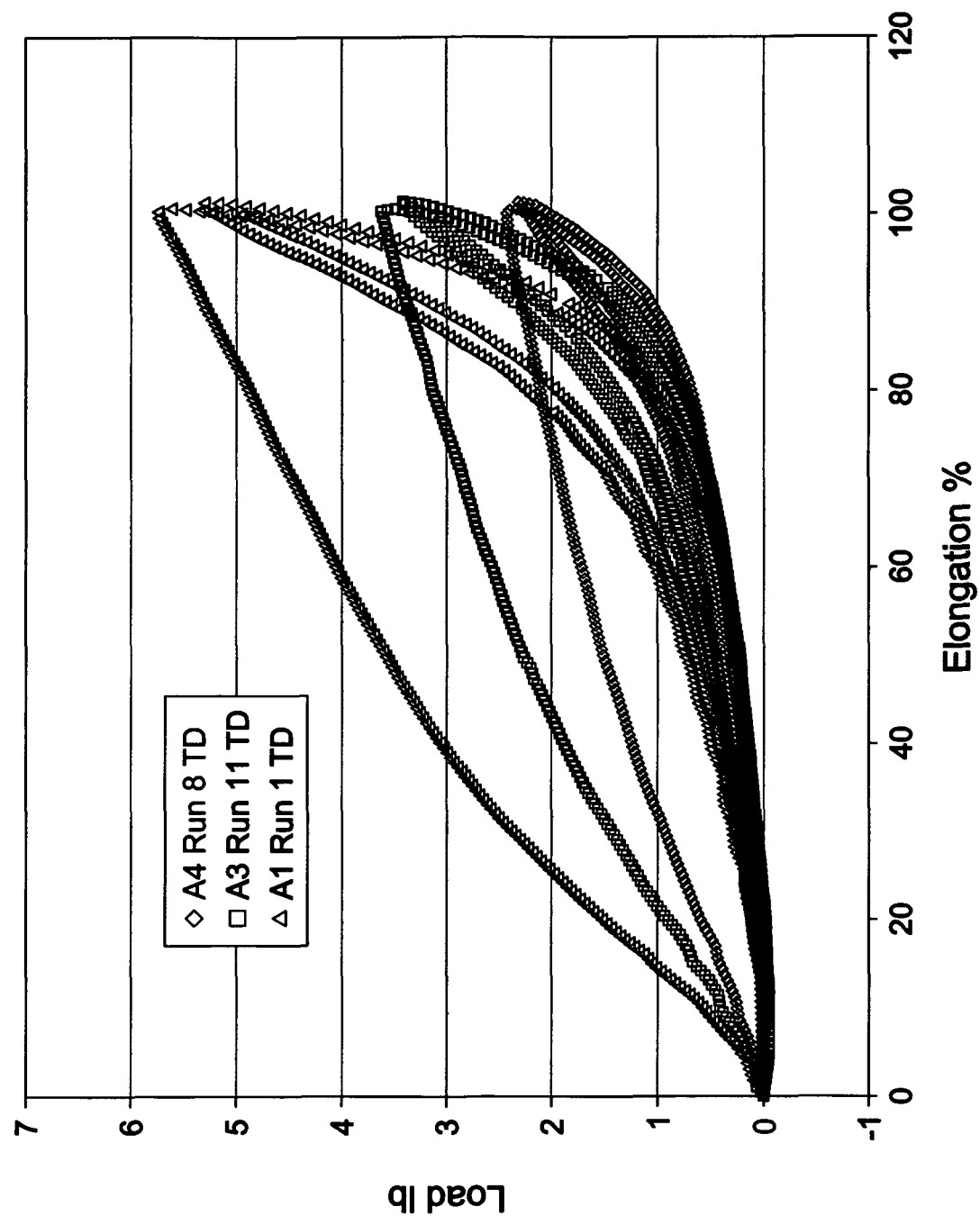

SPUNBOND FIBERS AND FABRICS FROM POLYOLEFIN BLENDS

TECHNICAL FIELD

The invention herein described and claimed relates to spunbond elastic fibers comprising polyolefin thermoplastic components at least one of which is an elastic ethylene-propylene copolymer having significant propylene crystallinity.

BACKGROUND OF THE INVENTION

Polypropylene is a well-known article of commerce, and is utilized in a wide variety of applications which are well known to those of ordinary skill in the art. Polypropylene is utilized widely in many fiber, fabric, or similar product applications. However, it is generally known to be deficient in applications that require high softness such as nonwoven fabrics for disposable garments and diapers. For such soft end-use fiber and fabric applications, macromolecules with a statistical placement of propylene and ethylene monomer units (hereinafter random copolymers) have come into use since they can be processed into fibers and fabrics that exhibit improved softness and drape characteristics in comparison to fibers and fabrics made from homopolymer polypropylene.

Random propylene-based copolymers have long been used in the making of nonwoven spunbond fabrics. In a typical spunbond process a random propylene copolymer resin in granular or pellet form is first fed into an extruder, wherein the resin simultaneously is melted and forced through the system by a heating melting screw. At the end of the screw, a spinning pump meters the melted polymer through a filter to a die (hereinafter the spinneret) having a multitude of holes (hereinafter capillaries) where the melted polymer is extruded under pressure through the capillaries into fibers. The fibers exiting the spinneret are solidified and drawn into finer diameter fibers by high-speed air jets. The solidified fibers are laid randomly on a moving belt to form a random fibrous, mesh-like structure known in the art as a fiber web. These random copolymers have been traditionally made by adding small amounts of ethylene, typically 0.5 to about 6.0 weight percent based upon total polymer weight, in the reacting medium comprising propylene and a catalyst that is capable of incorporating the ethylene monomer into the macromolecule chain, to thereby reduce the overall crystallinity and rigidity of the macromolecule. Random copolymers, because of their lower crystallinity and rigidity, are preferred over homopolymer polypropylene in fiber and fabric applications that require enhanced softness. However, a number of practical limitations have restricted the application of random copolymers in soft fiber and fabric uses. Accordingly, patent literature has discussed means of addressing these problems.

U.S. Pat. No. 6,218,010 relates to an ethylene-propylene copolymer alloy which is suited for making fibers and non-woven spunbond fabrics having softness at economically acceptable processing conditions. The alloy comprises a random copolymer having an ethylene content of from about 1 to about 5% by weight in an amount of from about 40 to about 90% by weight of the alloy; and a second ethylene-propylene copolymer having an ethylene content of from about 5 to about 40% by weight, in an amount of from about 10 to about 60% by weight of the alloy. The copolymer alloys are described to be prepared by a multi-reactor process comprising a first stage of polymerizing a mixture of ethylene and propylene in single or plural reactors, in the presence of a catalyst system capable of randomly incorporating the ethylene monomers and/or alpha-olefin into the macromolecules to form the random copolymer, and a second stage of, in the further presence of the random copolymer containing active catalyst, polymerizing a mixture of ethylene and propylene in single stage or in plural stages to form the second ethylene-propylene copolymer.

Fibers comprised of ethylene-propylene polyolefin alloys that are capable of preparation by both melt blown and spunbond processes are proposed in U.S. Pat. No. 6,342,565. These fibers are comprised of a soft, set-resistant, annealed fiber comprising a blend of polyolefins, said blend including: a) a first polymer component that is a propylene-ethylene copolymer having 80 weight percent or greater propylene, and having 20 weight percent or less ethylene, said first polymer component present in said fiber in the range of from 75-98 weight percent, based on the total weight of said polyolefins, and said first polymer component having a melting point as determined by differential scanning calorimetry (DSC) in the range of from 25-70° C. and a heat of fusion less than 25 J/g; and b) a second polymer component present in said fiber in the range of from 2-25 weight percent based on the total polymer in said fiber, wherein said second polymer component is a stereoregular isotactic polypropylene (iPP), having a melting point as determined by DSC greater than 130° C. and a heat of fusion greater than 120 J/g.

U.S. Pat. No. 6,635,715 describes blends of a first isotactic polypropylene homopolymer or copolymer component with a second alpha-olefin and propylene copolymer component, wherein the first isotactic polypropylene component has a melting point above about 110° C., preferably above about 115° C., and the second copolymer has a melting point between about 25° C. and 105° C. The blends are described to have from 2 to 95 wt % of the first component and from 98 to 5 wt % of the second copolymer component. In the examples, the polypropylene used is Escorene® 4292, an isotactic polypropylene homopolymer having a nominal melt flow rate (MFR) of 2.0 g/10 min, and the second copolymer is illustrated by an Mw (weight-average molecular weight) of 248,900 to 318,900 and by a Mooney viscosity (ML (1+4) at 125° C. according to ASTM D1646) of from 12.1 to 38.4. The blends are directed to improved mechanical properties of processing, increased tensile strength, elongation, and overall toughness.

Despite the improvements offered above, there is a continuing need for soft elastic fabric that is capable of being stretched while retaining overall integrity, one that is useful for various components in, for example, baby diapers, pull-up pants, adult incontinence products, disposable garments, and other coverings.

SUMMARY OF THE INVENTION

The invention described and claimed herein provides, in various embodiments, a polyolefin blend composition suitable for spunbond fiber or filament compositions comprising a) from 60-98 wt. % of at least one random propylene copolymer having a comonomer content of from 8 to 25 wt % based upon the total weight of the total copolymer and a crystalline melting transition point (Tm) as determined by differential scanning calorimetry (DSC) of from about 40° C. to about 110° C.; and b) from 2-40 wt. % of at least one substantially isotactic polypropylene homopolymer or copolymer having a crystalline melting transition point (Tm) as determined by DSC greater than 120° C. The blend generally has a melt flow rate (MFR) of from about 100 g/10 min to about 500 g/10 min.

The fibers or filaments comprising the inventive polyolefin blend compositions may be used for spun-bond non-woven fabrics, including those that are cut and fixed or bonded to other plastic or natural cloth sections to prepare composite sheet articles of commerce. Thus, the inventive polyolefin blend compositions may be used in spun-bond non-woven fabrics, which in turn can be used in composite constructions which include, but are not limited to, baby diapers, adult incontinence apparel, and other protective garments or covers, such as, for example, medical gowns or aprons, bedding, and similar disposable garments and covers.

BRIEF DESCRIPTION OF FIGURES

FIG. 1 is a comparison of hysteresis curves for tested fabrics from spunbond fibers including those made from the polyolefin blends of the invention.

DETAILED DESCRIPTION OF THE INVENTION

The polyolefin blend compositions according to the present invention can be used in spunbond processes to form fibers for nonwoven fabrics having an excellent balance of tensile strength and elongation properties. The fabric thus prepared exhibits excellent "feel" characteristics that are particularly suited for outer coverings of diapers, other incontinence apparel, and protective garments or covers, as addressed in the foregoing paragraphs. As such, the blends and fabrics described herein have desirable industrial applicability.

Propylene Copolymer Component

The propylene copolymer component of the polyolefin blend incorporates at least about 75 wt % propylene-derived units, wherein the propylene-derived units are generally isotactically arranged, and at least one comonomer selected from $C_2$ and/or $C_4$ to $C_6$ olefins, such as for example ethylene, 1-butene, and/or 1-hexene, preferably ethylene. The copolymer typically comprises about 8 wt % to about 25 wt % (based upon the total weight of the copolymer) of said at least one comonomer. The comonomer content is preferably about 8 to about 18 wt %, more preferably about 10 to about 18 wt %, for example from 12-18 wt %. The copolymer preferably has a melting transition point (Tm) by Differential Scanning Calorimetry (DSC) ranging from an upper limit of less than 110° C., less than 100° C., less than 90° C., or less than 75° C. to a lower limit of greater than 20° C., greater than 25° C., greater than 40° C., or greater than 45° C. The copolymer generally has a heat of fusion less than about 75 J/g, preferably from about 0.5 to about 70 J/g.

The Differential Scanning Calorimetry (DSC) procedure used to determine the Tm of the polymer is described as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The melting point is recorded as the temperature of the greatest heat absorption within the range of melting of the sample.

This propylene copolymer component of the polymer blend compositions of the present invention comprises propylene and at least one other olefin monomer having 6 or fewer carbon atoms, preferably ethylene, as described above. Optionally, the propylene copolymer may further comprise, in addition to the above mentioned comonomers, small amounts (e.g., 0.5 to 6.0 wt %, based upon the total weight of the copolymer) of a $C_4$ to $C_{20}$ diolefin, such as, for example, 1,4-hexadiene, dicyclopentadiene, ethylidene-norbornene, and vinyl-norbornene. The random copolymer component of the present inventive composition preferably has a narrow compositional distribution (CD). This intermolecular composition distribution of the polymer is determined by thermal fractionation in a solvent such as hexane or heptane. This thermal fractionation procedure is generally as follows. Typically, approximately 75% by weight and more preferably 85% by weight of the polymer is isolated as one or two adjacent soluble fractions with the balance of the polymer in immediately preceding or succeeding fractions. In order for the copolymer to have a narrow compositional distribution as discussed above, each of the isolated fractions will generally have a composition (wt % ethylene content) with a difference of no greater than 20 wt % (relative) and more preferably 10 wt % (relative) from the average wt % ethylene content of the entire second polymer component.

The ethylene content can be measured as follows for a copolymer having an ethylene content between 5 and 40 wt % ethylene. A thin homogeneous film is pressed according to sub-method A of ASTM D-3900. It is then mounted on a Perkin Elmer Spectrum 2000 infrared spectrophotometer. A full spectrum is recorded using the following parameters: Resolution: 4.0 cm$^{-1}$, Spectral Range: 4500 to 450 cm$^{-1}$. Ethylene content is determined by taking the ratio of the propylene band area at 1155 cm$^{-1}$ to the ethylene band area at 732 cm$^{-1}$ ($C_3/C_2$=AR) and applying it to the following equation:

Wt % Ethylene=$73.492-89.298X+15.637X^2$, where X=AR/(AR+1) and AR is the peak area ratio (1155 cm$^{-1}$/722 cm$^{-1}$).

The propylene copolymer component preferably has a narrow molecular weight distribution (MWD), generally between about 1.8 and about 5.0, preferably less than or equal to 4.0, with an MWD between about 2.0 and about 3.2 being more preferred. MWD is defined as the ratio of the weight-average molecular weight of a polymer (Mw) to the number-average molecular weight (Mn) of that polymer.

Means for preparing the random propylene copolymer are well known in the literature, and generally are conducted using single-site, transition metal, stereospecific catalyst systems. Though traditional Ziegler-Natta polypropylene catalysts do produce isotactic sequences of propylene, they generally do not form polymers having the other characteristics described herein, such as comonomer amount, random incorporation of comonomer, and uniformity of incorporation of propylene and comonomer into the polymer chain. Thus chiral, bridged biscyclopentadienyl transition metal catalysts are preferred, see, for example, U.S. Pat. Nos. 6,218,010, 6,342,565, and 6,635,715. Also preferred are certain transition metal-centered, heteroaryl ligand catalyst systems, see, e.g., U.S. Pat. No. 6,960,635. Such single-site catalysts are typically used with activating co-catalysts, such as alkylaluminum compounds, alkylaluminoxane compounds, and non-coordinating ions, such as those of U.S. Pat. Nos. 6,121,395 and 6,245,706. Polymerization processes are well-known and may be carried out by continuous or batch processes, particularly continuous solution, bulk, slurry, or gas phase polymerization, and may include the use of chain transfer agents, scavengers, or other such additives as known to be applicable in the art.

Substantially Isotactic Polypropylene Component

In accordance with the present invention, the isotactic polypropylene (iPP) component of the blend may comprise homopolymers of propylene, copolymers containing propylene, or some blends thereof. The iPP component of the present invention is predominately crystalline, i.e., it has a melting point generally greater than about 120° C., preferably greater than about 140° C. Generally, the crystallinity of the iPP will be greater than 50%, as determined by the DSC procedure above. The thermal energy (Hf) for the highest order of polypropylene is estimated at 189 J/g (i.e., 100% crystallinity is equal to 189 J/g).

Where iPP copolymers make up the iPP component of the blend, they are different from the random copolymers described previously largely in the amount of incorporated comonomer and/or the randomness thereof, as is reflected in the difference in melting point as measured by DSC. The iPP used in the present blends can vary widely in form. For example, substantially isotactic polypropylene homopolymer can be used, or the polypropylene can be in the form of a copolymer containing less than or equal to about 10 wt % of other monomer, i.e., at least about 90 wt % propylene, and most preferably at least about 94 wt % propylene. Further, the iPP can be present in the form of a graft or block copolymer, in which the blocks of polypropylene have substantially the same stereoregularity as the propylene-alpha-olefin copolymer, so long as the graft or block copolymer has a sharp melting point above about 120° C., characteristic of the stereoregular propylene sequences. The iPP component may be a combination of homopolypropylene, and/or random, and/or block copolymers as described herein, and may comprise those polymers known in the industry as reactor copolymers or impact copolymers. When the iPP component is a random copolymer, the percentage of the copolymerized olefin monomer in the copolymer is, in general, up to about 10% by weight, preferably from about 2% to about 8% by weight, most preferably from about 2% to about 6% by weight. The olefin comonomer may be one or more $C_2$ and/or $C_4$-$C_{12}$ alpha-olefin. The most preferred olefin is ethylene. One, two, or more olefins may be copolymerized with propylene.

Exemplary olefins include ethylene and higher alpha-olefins such as butene-1, pentene-1,2-methylpentene-1,3-methylbutene-1, hexene-1,3-methylpentene-1,4-methylpentene-1,3,3-dimethylbutene-1, heptene-1, hexene-1, methylhexene-1, dimethylpentene-1 trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, and dodecene-1.

The iPP component may be available commercially, and/or may typically be prepared by coordination polymerization using catalysts capable of adding propylene monomers to a growing chain in a stereoregular, isotactic manner. There is no particular limitation on the method for preparing the iPP component of the invention. However, in general, the polymer is a propylene homopolymer obtained by homopolymerization of propylene in a single stage or multiple stage reactor, or a copolymer obtained by copolymerizing propylene and one or more olefin in a single stage or multiple stage reactor, such as one or more reactors in series or parallel, wherein the reactors may be of like or different type. Polymerization methods may include high pressure, slurry, gas, bulk, or solution phase methods, or one or more combinations thereof, using a traditional Ziegler-Natta stereospecific catalyst system and/or any transition metal catalyst system capable of stereoregular polymerization. Suitable catalyst systems thus include chiral metallocene catalyst systems, see, e.g., U.S. Pat. No. 5,441,920, and transition metal-centered, heteroaryl ligand catalyst systems, see, e.g., U.S. Pat. No. 6,960,635. The catalyst used is preferably one which has a high isospecificity. Polymerization may be carried out by continuous or batch processes and may include use of chain transfer agents, scavengers, or other such additives as deemed applicable.

Thus, suitable iPP components may include those polypropylene copolymers known in the trade as reactor copolymers, impact copolymers, and other random, block or graft polypropylene copolymers, all having a melting transition point at or above 120° C. Both the isotactic homopolymers and copolymers of the invention have molecular weight distributions (MWD) as measured by gel permeation chromatography (GPC), using polystryrene standards with suitable corrections as provided by light angle scattering methods, from about 2 to about 10, preferably from about 2 to about 8, and a melt flow rate in accordance with ASTM D1238 or ISO 1133, of about 0.2 to about 1500 g/min. The ASTM and ISO methods vary somewhat in test procedure, but provide similar results.

The blend compositions according to the invention will typically comprise from about 60 to about 98 wt % of the propylene copolymer component and from about 2 to about 40 wt % of the iPP component, where said weight percent is based upon the total polymer weight. The blend compositions preferably will comprise from 60-95 wt % of the propylene component and from 5-40 wt % of the iPP component, more preferably from 70-92 wt % propylene copolymer and 8-30 wt % iPP, and most preferably 80-90 wt % propylene copolymer and 10-20 wt % iPP.

In the normal practice of the invention, it is optional, but may be desirable, to include chemical additives known in the plastics processing industry for purposes of improving processing or stabilizing the final blend against degradation from environmental exposure, aging and the like. Thus, various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. Slip agents are also suitable as additives, and can improve the overall feel of the article. Such slip agents include euracamide, oleamide and the like. Specific examples of suitable additives are presented in U.S. Patent Publication No. 2006-0183861. The amounts of the additives will vary somewhat by function but will generally be from 0, or from about 0.2 wt %, to less than or equal to about 10 wt %, based upon the total weight of the composition. The list of additives provided herein is merely illustrative and is not intended to be a limiting description of all types of additives which may be employed in the present invention.

Fibers made from the polyolefin polymer blends of the present invention may be prepared, for example, by blending the propylene copolymer and the iPP components such that, when blended, the final blend has an MFR within the described range of the invention (i.e., from about 100 to about 500); blend compositions having an MFR below the described range may also be subjected to a controlled rheology (CR) process well known in the art in order to bring the blend within the desired MFR range. CR processes are described in further detail below. Suitable MFR values for the components of the blend compositions of the invention are from 0.1 to 200 g/10 min for the propylene copolymer and from 0.1 to 2000 g/10 min for the iPP. Suitable amounts of each should be within the ranges described, thus allowing one of ordinary skill to select the components to create a blend having the desired MFR value. For example, 90 wt % of a propylene copolymer of MFR 150 could be blended with 10 wt % of iPP of MFR 1500 to give a blend of MFR 170.

In a CR process, the copolymer is visbroken, or "cracked", by the action of free radical agents, for example peroxides, especially dialkyl peroxides, into a resin having a narrower molecular weight distribution and a higher melt flow rate in order to facilitate fiber spinning. The melt flow rate (MFR) of a visbroken copolymer blend determines the level of melt viscosity and the ultimate physical properties of the fiber. The MFR of the visbroken blend as determined by the test ASTM D1238, Condition L, may vary within a range from 100 to about 500 g/10 minutes, preferably between about 120 to about 400 g/10 min, and most preferably between about 160 to about 350 g/10 min. The MWD of the visbroken alloy may also vary within a wide range, but a generally narrow overall MWD is preferred for fiber applications. MWD plays a role in melt processibility as well as the level and balance of physical properties achievable. The MWD of the visbroken alloy may vary from extremely narrow (as in a polydispersity, Mw/Mn, of about 2), to broad (as in a polydispersity of about 12). An MWD in the range of from about 2 to about 6 is preferred, and an MWD in the range of from about 2 to about 4 is most preferred.

After either the blending or the CR process, it may be desirable to convert the polymer melt or granules to pellets for easier feeding into a fiber spinning extruder. Some or all of the additives, such as stabilizers, pigments, fillers, antioxidants, ultra-violet screening agents, nucleating agents, certain processing oils and the like may optionally be added in the blending or CR processes; however, this should not be considered a limitation of the present invention. CR processes are described in U.S. Pat. No. 4,143,099, the description of which is incorporated herein by reference for the purposes of U.S. patent practice.

The polymer blend, being within the inventive MFR range, or after being cracked to such, may then be drawn to a fine diameter fiber by one of several modifications of the basic melt-extrusion fiber process that are well known in the art. This process includes the steps of (1) continuously feeding the copolymer alloy to a melting screw extruder; (2) simultaneously melting and forcing the copolymer alloy through a spinneret whereby the alloy is extruded into fibers under pressure through holes that, depending upon the desired fiber product, may vary widely in number, size and shape; (3) solidifying the fibers by transferring the heat to a surrounding medium; and (4) winding of the solidified fibers onto packages. Further processing typically includes orienting the fibers by drawing it to many times its original length. Also, a variety of thermal and texturing treatments well known in the art may be employed, depending on the desired final properties of the fiber. In some embodiments of the present invention, polymer blends are drawn into fine diameter fibers at generally high drawdown speed, without the individual fibers sticking together below the crystallization point.

Although the terms "draw-down speed" and "crystallization point" are well known among those skilled in the art, a brief explanation is provided herein in the interest of clarity. The drawdown speed is measured by extruding the polymer through a capillary at a given rate throughout, typically 0.3-1.2 g/hole/min. The take up speed of the fiber is increased until the fibers break. The maximum take up speed, at which the fiber breaks, is defined as the drawdown speed. For effective spinning in a spunbond process, a resin should have at least about 1,000 meters/minute of drawdown speed capability.

The crystallization point is the point at some distance below the spinneret where the fibers solidify. The characteristic resulting melt viscosity of the blends results in the formation of fine fibers that give an having exceptional balance of softness, spinning capability, and physical properties including low force to extension, elasticity and elongation.

One embodiment of the present invention involves the use of the inventive polymer blends in the making of spunbond fabrics. Conventional spunbond processes are illustrated in U.S. Pat. Nos. 3,825,379; 4,813,864; 4,405,297; 4,208,366; and 4,334,340, all of which are incorporated herein by reference for purposes of U.S. patent practice. The spinbonding process is one which is well known in the art of fabric production. Generally, continuous fibers are extruded, laid on an endless belt, and then bonded to each other, and often times to a second layer such as a melt blown layer, often by a heated calender roll, or by addition of a binder. An overview of spinbonding may be obtained from L. C. Wadsworth and B. C. Goswami, Nonwoven Fabrics: "Spunbonded and Melt Blown Processes." Proceedings of the Eighth Annual Nonwovens Workshop, Jul. 30-Aug. 3, 1990, sponsored by TANDEC, University of Tennessee, Knoxville, Tenn.

A typical spunbond process generally includes a continuous filament extrusion process, followed by drawing, web formation by the use of some type of ejector, and bonding of the web. In accordance with the invention, typically, high MFR blend pellets are fed into an extruder. Alternatively, blend components may be metered independently at the extruder hopper. In the extruder, the pellets simultaneously are melted and forced through the system by a heating melting screw. At the end of the screw, a spinning pump meters the melted polymer through a filter to a spinneret where the melted polymer is extruded under pressure through capillaries, generally at a rate of about 0.3-1.0 grams per hole per minute. The spinneret typically contains a few hundred capillaries, measuring about 0.4-0.6 mm in diameter. The polymer is usually heated to a temperature of about 30° C.-50° C. above its melting point to achieve sufficiently low melt viscosity for extrusion. The fibers exiting the spinneret are quenched and drawn into fine fibers measuring about 10-40 microns in diameter by cold air jets having a velocity of 1000-6000 m/minute. The solidified fiber is laid randomly on a moving belt to form a netlike structure known in the art as web. After web formation, the web is heat-bonded to achieve its final strength, generally by using a heated textile calender known in the art as thermobond calender. The calender may contain two heated steel rolls; one roll is plain and the other bears a pattern of raised points. The web is conveyed to the calender and a fabric is formed by pressing the web between the rolls at a bonding temperature of about 60° C.-100° C.

While bonding may occur within a wide temperature range, the bonding temperature should be optimized to achieve a fabric having maximum mechanical strength. Overbonding, that is, bonding at a temperature greater than the optimum temperature, results in significantly weaker fibers around the bonding point because of excessive melting of the fiber. These become the weak points in the fabric. Underbonding, that is, bonding at a temperature lower than the optimum temperature, results in insufficient bonding at the fiber-to-fiber links. The optimum bonding temperature is readily determined by persons having skill in the art, and depends upon the nature of the material from which the fibers are made.

Spunbond fabric compositions produced using the polyolefin blends of the present invention exhibit a surprisingly good balance of softness and mechanical strength. Moreover, their optimum bonding temperature is lower than that of conventional random copolymers, thus permitting less expensive processing. Note that all of the copolymers shown in FIG. 1 were melt spun at the same low drawdown speed in order to allow for a meaningful comparison.

EXAMPLES

An exemplary propylene copolymer comprising 15 wt % ethylene ("PE1"), with an MFR of 20 g/10 min and a density of 0.863 g/cm$^3$, and having propylene crystallinity, was prepared by solution metallocene polymerization. PE1 is sold as VM2000 by ExxonMobil Chemical Co. After annealing for four days, PE1 was determined to have a Tm of 48° C. and a heat of fusion of 19 J/g, using the DSC procedure described previously. PE1 has an MWD (by GPC as corrected by LALLS) of 1.9, an Mw of 134,000, and an Mn of 72,000.

In the following examples, PE1 was pelletized and then melt blended with various amounts of polypropylene homopolymer pellets, available commercially as PP3155 from ExxonMobil Chemical Co ("PP1"), and an organic dialkyl peroxide available commercially as Luperox® 101 (2,5-dimethyl-2,5-di(t-butylperoxy)hexane) from Arkema Inc. PP1 is a suitable grade for nonwoven and fiber applications, and has a Tm of 166° C. and a heat of fusion of 98 J/g (in the first heat cycle). PP1 has an MFR of 36 g/10 min and an MWD of <3.0. Blending was accomplished in a single screw Davis Extruder having an L:D ratio of 24/1, equipped with an underwater pelletizer. A temperature profile typical of polypropylene blends, i.e. from 220° C. to 250° C., was maintained with a production rate of 50 lbs/hr (22.7 kg/hr). The composition of the resulting blends is shown in Table 1. Blends A1 and A2 are control blends, while blends A3 and A4 represent inventive blends.

TABLE 1

| Blend | Amount PP1 (wt. %) | Amount Peroxide (ppm) | Blend MFR (g/10 min) |
|---|---|---|---|
| A1 | 15 | 700 | 80 |
| A2 | 10 | 700 | 80 |
| A3 | 15 | 2000 | 200 |
| A4 | 10 | 2000 | 200 |

Spunbond fabric trials were conducted on a Reicofil™ line (made by the Reifenhauser Company, Germany) located at TANDEC spinbonding facilities at the University of Tennessee in Knoxville, Tenn. The single screw extruder size was 70 mm with a 30:1 L/D (length:diameter) ratio. The spinneret had 4036 die plate holes, each with a diameter of 0.6 mm. Continuous fibers were extruded onto an endless belt and then bonded to each other using heated calender rolls, one plain and the other bearing a pattern of raised points. The actual bonded area represented about 14.5% of the total web surface area. Resins were run at a temperature of 215° C. at the die with quench air at 12° C.-13° C. The calender rolls were maintained at 185° C.-195.6° C. with minimum nip pressure. As used in Table 2, below, the abbreviation GHM means grams of polymer per hole per minute, and GSM means grams per square foot, given as g/ft$^2$ (g/cm$^2$). The fabric 'formation' (uniformity of distribution of fibers in the fabric) was observed to be satisfactory for all of the blend example fabrics.

As used herein, the Peak Force and Peak Elongation of a fiber or nonwoven sample, (including a fabric) were measured according to ASTM D-5035-95 (2003) with four modifications: 1) the jaw width was 5 in (12.7 cm) instead of 3 in (7.6 cm); 2) the test speed was 5 in/min (12.7 cm/min) instead of 12 in/min (30.5 cm/min); 3) a metallic arc-type upper line grip and a flat lower rubber grip was used instead of a flat metallic upper and a flat metallic lower grip; and 4) 6 MD and 6 TD measurements instead of 5 MD and 8 TD measurements were made for each specimen. Process conditions for each test run are shown in Table 2, and properties of the resulting fabrics are shown in Table 3.

TABLE 2

Process Conditions for A3 and A4 along with A1 and A2 as controls.

| Run No. | Blend | Output, g/hole/min | Basis Wt., g/m$^2$ | Blower rpm | Suction rpm | Fiber Dia. (μm) | Std. Dev. Fiber Dia % |
|---|---|---|---|---|---|---|---|
| 1 | A1 | 0.2 | 69.4 | 2696 | 2283 | 16.3 | 8.73 |
| 2 | A1 | 0.4 | 69 | 3027 | 2491 | 15.6 | 11.19 |
| 3 | A1 | 0.4 | 69.5 | 3008 | 2496 | 20 | 7.65 |
| 4 | A1 | 0.4 | 68.9 | 2705 | 2200 | 22.9 | 7.27 |
| 5 | A4 | 0.4 | 67 | 3022 | 2479 | 24.7 | 6.22 |
| 6 | A4 | 0.2 | 68 | 2595 | 2080 | 21.1 | 13.8 |
| 7 | A4 | 0.2 | 72.5 | 3018 | 2488 | 18 | 4.54 |
| 8 | A4 | 0.2 | 69.9 | 3017 | 2474 | 17.7 | 7.24 |
| 9 | A4 | 0.2 | 45.7 | 3013 | 2476 | 18 | 6.24 |
| 10 | A4 | 0.4 | 71.5 | 3022 | 2476 | 25.7 | 6.27 |
| 11 | A3 | 0.2 | 68.5 | 3010 | 2481 | 16.8 | 8.39 |
| 12 | A3 | 0.2 | 41 | 3001 | 2481 | 16.4 | 9.19 |
| 13 | A3 | 0.4 | 70 | 3000 | 2481 | 22.7 | 9.1 |
| 14 | A2 | 0.2 | 69.2 | 2700 | 2300 | 17.5 | 8.42 |

TABLE 3

Fabric Properties of fabrics described in Table 2.

| Run No. | Resin ID | Fiber Dia (μm) | Std. Dev. Fiber Dia (%) | Peak Load MD (lb (kg)) | Elongation MD (%) | Peak Load TD (lb (kg)) | Elongation TD (%) |
|---|---|---|---|---|---|---|---|
| 1 | A1 | 16.3 | 8.73 | 7.23(3.3) | 130 | 3.83(1.7) | 189 |
| 2 | A1 | 15.6 | 11.19 | 7.94(3.6) | 131 | 4.3(2.0) | 191 |
| 3 | A1 | 20 | 7.65 | 4.27(1.9) | 154 | 2.92(1.3) | 204 |
| 4 | A1 | 22.9 | 7.27 | 3.06(1.4) | 171 | 2.08(0.9) | 197 |

TABLE 3-continued

Fabric Properties of fabrics described in Table 2.

| Run No. | Resin ID | Fiber Dia (μm) | Std. Dev. Fiber Dia (%) | Peak Load MD (lb (kg)) | Elongation MD (%) | Peak Load TD (lb (kg)) | Elongation TD (%) |
|---|---|---|---|---|---|---|---|
| 5 | A4 | 24.7 | 6.22 | 1.4(0.6) | 214 | 0.85(0.4) | 321 |
| 6 | A4 | 21.1 | 13.8 | 2.8(1.3) | 186 | 1.59(0.7) | 231 |
| 7 | A4 | 18 | 4.54 | 3.3(1.5) | 160 | 2.27(1.0) | 154 |
| 8 | A4 | 17.7 | 7.24 | 3.35(1.5) | 137 | 1.77(0.8) | 187 |
| 9 | A4 | 18 | 6.24 | 1.82(0.8) | 115 | 1.06(0.5) | 169 |
| 10 | A4 | 25.7 | 6.27 | 1.39(0.6) | 179 | 0.95(0.4) | 226 |
| 11 | A3 | 16.8 | 8.39 | 5.39(2.5) | 136 | 3(1.4) | 176 |
| 12 | A3 | 16.4 | 9.19 | 2.48(1.1) | 99 | 1.29(0.6) | 141 |
| 13 | A3 | 22.7 | 9.1 | 2.55(1.2) | 175 | 1.89(0.9) | 202 |
| 14 | A2 | 17.5 | 8.42 | 4.94(2.2) | 145 | 2.8(1.3) | 197 |

Fabrics made under similar conditions and having similar basis weights were compared. In particular, the inventive fabrics of runs 8 and 11 were compared with the control fabric of run 1. The results are shown in Table 4. Hysteresis of the samples, also shown graphically in FIG. 1, was measured on an Instron Instrument with a 2 in. (5.08 cm) grip. Specimens sized 2 ft by 7 ft (61 cm by 213 cm) were used with a gage length of 3 in. (7.6 cm) and a crosshead speed of 20 in/min (50.8 cm/min). A 3-cycle test was done to 100% elongation without repositioning the fabric between cycles. Definitions: 1) Load loss at 50%=100×(load-up-load-down)/load-up; 2) Permanent set=Elongation at which load equals zero in the down cycle, expressed in %.

As seen in Table 4, the inventive fabrics have elasticity (as shown by the permanent set measurement) similar to that of the control fabric, which is unexpected since the inventive fabrics have a lower molecular weight and would therefore be expected to have decreased elasticity. Further, the force-to-extension values of the inventive fabrics, as illustrated by the load loss at 50%, are lower than that of the control fabric, which is favorable for applications such as diapers or other undergarments in which the ease of extension of the fabric is a key property. As such, the inventive polymers have low force to extension while maintaining the elasticity of the fabrics.

TABLE 4

Elasticity data for selected fabrics from Table 3.

|  | A1 (run #1) | A4 (run #8) | A3 (run #11) |
|---|---|---|---|
| MD | | | |
| Cycle 1 | | | |
| Load Loss at 50%, % | 92.3 | 84.5 | 90.0 |
| Permanent Set, % | 16.4 | 11.5 | 16.8 |
| Cycle 2 | | | |
| Load Loss at 50%, % | 60.6 | 42.9 | 56.8 |
| Permanent Set, % | 18.7 | 10.2 | 8.9 |
| Cycle 3 | | | |
| Load Loss at 50%, % | 56.5 | 40.4 | 53.3 |
| Permanent Set, % | 19.8 | 10.5 | 10.0 |
| TD | | | |
| Cycle 1 | | | |
| Load Loss at 50%, % | 90.6 | 80.1 | 87.8 |
| Permanent Set, % | 16.4 | 10.9 | 17.7 |
| Cycle 2 | | | |
| Load Loss at 50%, % | 56.4 | 43.9 | 56.8 |
| Permanent Set, % | 18.7 | 8.9 | 19.6 |
| Cycle 3 | | | |
| Load Loss at 50%, % | 54.9 | 39.0 | 52.9 |
| Permanent Set, % | 19.8 | 9.3 | 21.1 |

A comparison of curves for inventive examples with a control fabric (FIG. 1) shows the significant reduction in load at a given elongation resulting in softer fabrics with similar elasticity.

Although the present invention has been described in considerable detail with reference to certain aspects and embodiments thereof, other aspects and embodiments are possible. For example, while ethylene vinyl acetate copolymers have been exemplified, other copolymers are also contemplated. Therefore, the spirit and scope of the appended claims should not be limited to the description of the versions contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference for all jurisdictions in which such incorporation is permitted.

We claim:

1. A spun-bond nonwoven point heat-bonded fabric comprising a polyolefin blend composition, said polyolefin blend comprising:
   a) from about 80 to about 90 wt % of at least one elastomeric random propylene copolymer with ethylene having an ethylene content of from 8 to 18 wt % based upon the total copolymer weight and a crystalline melting transition point (Tm) as determined by differential scanning calorimetry (DSC) of from about 40° C. to about 75° C.; and
   b) from about 10 to about 20 wt % of at least one substantially isotactic polypropylene homopolymer or copolymer, having a crystalline melting transition point (Tm) as determined by DSC greater than about 120° C.;
   wherein said blend has a melt flow rate (MFR) of from about 160 g/10 min to about 500 g/10 min,
   wherein said fabric has an about 69 g/m² basis weight, having been point heat-bonded in a calendar roll, and has a first cycle load loss at 50% of less than or equal to 90%; and wherein the fibers that make up the fabric have an average diameter within the range of from 16.4 to 25.7 μm.

2. The spun-bond nonwoven fabric according to claim 1, wherein said polyolefin blend has an MFR of from about 160 g/10 min to about 400 g/10 min.

3. The spun-bond nonwoven fabric according to claim 1, wherein said polyolefin blend has an MFR of from about 160 g/10 min to about 350 g/10 min.

4. The spun-bond nonwoven fabric according to claim 1, wherein said random propylene copolymer has a heat of fusion of from about 0.5 J/g to about 70 J/g.

5. The fabric according to claim 1, further comprising one or more slip agents.

6. The fabric according to claim 1, wherein said fabric is used in composite constructions.

7. The fabric according to claim 6, wherein said construction is a diaper, adult incontinence apparel, protective garment, or cover.

8. A process for preparing point heat-bonded spunbond fabrics compositions comprising:
   a) providing a polyolefin blend composition comprising:
      i) from about 80 to about 90 wt % of at least one elastomeric random propylene copolymer with ethylene having an ethylene content of from 8 to 18 wt % and a crystalline melting point (Tm) as determined by differential scanning calorimetry (DSC) from about 40 to about 75° C.; and
      ii) from about 10 to about 20 wt % of at least one substantially isotactic propylene homopolymer or copolymer comprising one or more $C_2$ and/or $C_4$-$C_8$ comonomer, having a crystalline melting point (Tm) as determined by DSC greater than or equal to 120° C.;
   b) subjecting the blend to a controlled rheology process so as to achieve a melt flow rate (MFR) of from about 160 dg/min to about 500 g/10 min;
   c) drawing the blend into fibers having a diameter of about 16.4 to about 25.7 μm; and
   d) laying the fibers randomly on a moving belt and heat-bonding portions of the formed web in a calendar roll at from 185.5 to 195.5° C.;
   to form a spun-bond fabri, wherein the spun-bond fabric has an about 69 g/m² basis weight and has a first cycle load loss at 50% of less than or equal to 90%.

9. The process according to claim 8, wherein said random propylene copolymer has a heat of fusion of from about 0.5 J/g to about 70 J/g.

10. A process for preparing point heat-bonded spunbond fabric comprising:
    a) providing a polyolefin blend composition comprising:
       i) from about 80 to about 90 wt % of at least one elastomeric random propylene copolymer with ethylene having an ethylene content of from 8 to 18 wt % and a crystalline melting point (Tm) as determined by differential scanning calorimetry (DSC) from about 40 to about 75° C.; and
       ii) from about 10 to about 20 wt % of at least one substantially isotactic propylene homopolymer or copolymer comprising one or more $C_2$ and/or $C_4$-$C_8$ comonomer, having a crystalline melting point (Tm) as determined by DSC greater than or equal to 120° C.;
       wherein the random propylene copolymer and the substantially isotactic propylene polymer are selected such that the melt flow rate (MFR) of the resulting blend is between about 160 g/10 min to about 500 g/10 min;
    b) drawing the blend into fibers having a diameter of about 10 to about 40 microns; and
    c) laying the fibers randomly on a moving belt and heat-bonding about 14.5% of the surface area of the formed web in a calendar roll at a temperature from 185.5 to 195.5° C.;
    to form a spun-bond fabric composition, wherein the spun-bond fabric composition has an about 69 g/m² basis weight and has a first cycle load loss at 50% of less than or equal to 90%.

11. The process of claim 10, wherein the fibers that make up the fabric have an average diameter within the range of from 16.4 to 25.7 μm.

* * * * *